(12) United States Patent
Smith

(10) Patent No.: US 7,402,623 B1
(45) Date of Patent: Jul. 22, 2008

(54) COMPOSITION AND PROCESS FOR TREATING CONCRETE

(75) Inventor: Paul A. Smith, Mentor-on-the-Lake, OH (US)

(73) Assignee: ChemMasters Inc., Madison, OH (US)

( * ) Notice: Subject to any disclaimer, the term of this patent is extended or adjusted under 35 U.S.C. 154(b) by 331 days.

(21) Appl. No.: 10/959,376

(22) Filed: Oct. 6, 2004

(51) Int. Cl.
*C08K 5/554* (2006.01)

(52) U.S. Cl. .................................. 524/492; 524/261

(58) Field of Classification Search ............ 524/261, 524/492
See application file for complete search history.

(56) References Cited

U.S. PATENT DOCUMENTS

| | | | |
|---|---|---|---|
| 4,600,657 A | 7/1986 | Wegehaupt et al. | 428/447 |
| 4,600,677 A * | 7/1986 | Hoffend et al. | 430/108.2 |
| 5,112,393 A | 5/1992 | Engel et al. | 106/2 |
| 5,371,165 A | 12/1994 | Patrick et al. | 528/23 |
| 5,385,975 A | 1/1995 | Nakamura et al. | 525/101 |
| 6,162,505 A | 12/2000 | Schwartz et al. | 427/407.1 |
| 6,403,711 B1 | 6/2002 | Yang et al. | 525/100 |
| 6,423,805 B1 | 7/2002 | Bacho et al. | 526/319 |
| 6,573,321 B2 | 6/2003 | Karuga et al. | 524/265 |
| 6,743,854 B2 | 6/2004 | Yeats et al. | 524/731 |
| 2001/0021749 A1 | 9/2001 | Yeats et al. | 525/100 |
| 2002/0040102 A1 | 4/2002 | Nixon | 525/100 |
| 2003/0139541 A1 | 7/2003 | Nixon | 525/474 |
| 2004/0082735 A1 | 4/2004 | Yeats et al. | 525/476 |

FOREIGN PATENT DOCUMENTS

| | | | |
|---|---|---|---|
| EP | 0 449 263 A2 | 10/1991 | |
| EP | 1 048 676 A2 | 11/2000 | |
| EP | 1 040 165 B1 | 6/2002 | |
| JP | 55102673 A * | 8/1980 | |
| WO | 99/31179 A1 | 6/1999 | |
| WO | 01/51575 A1 | 7/2001 | |
| WO | 01/98419 A1 | 12/2001 | |

OTHER PUBLICATIONS

Vexcon Chemicals, Inc. Product Literature for Certi-Vex Guard.

* cited by examiner

*Primary Examiner*—Robert D. Harlan
(74) *Attorney, Agent, or Firm*—Renner, Otto, Boisselle & Sklar, LLP

(57) ABSTRACT

The disclosure relates to a composition, comprising: (a) at least one organohydrocarbyloxysilane represented by the formula

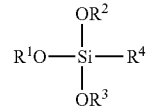

wherein $R^1$, $R^2$ and $R^3$ are independently hydrocarbyl groups containing from 1 to about 8 carbon atoms, and $R^4$ is a hydrocarbyl group containing from 1 to about 22 carbon atoms; and (b) at least one polymer derived from styrene and/or at least one styrene derivative, and at least one comonomer comprising one or more of acrylic acid, (meth)acrylic acid, acrylonitrile, and/or at least one alkyl (meth)acrylate. In one embodiment, the composition further comprises (c) at least one fluid, the organohydrocarbyloxysilane (a) and polymer (b) being dispersed in the fluid. This composition may be used for treating concrete surfaces.

6 Claims, No Drawings

COMPOSITION AND PROCESS FOR TREATING CONCRETE

TECHNICAL FIELD

This invention relates to a composition and process for treating concrete.

BACKGROUND OF INVENTION

In order for concrete to harden properly, it is important for it to retain its moisture as long as possible, and then keep additional water out once it has dried. Concrete is typically made from mixtures of cement, water, and aggregates. After mixing the ingredients to form the concrete mixture, the mixture soon starts to harden through a chemical reaction known as hydration. The concrete is laid before the mixture gets too hard, and steps are typically taken to ensure that a minimum amount of flaws due to air pockets occur.

After being laid, it is advantageous for the concrete to retain its moisture for as long as possible to prolong the hydration process; the longer the concrete is kept moist, the stronger and more durable it will become. Techniques are known for treating concrete surfaces with membrane-forming coating compositions to hold the moisture in during curing. Examples of such membrane-forming coating compositions include wax-based compositions, resin-based compositions, sodium silicates, and the like.

It is known that once substantially dry, concrete surfaces are prone to suffer from water damage. This occurs because water penetrates the concrete surface resulting in concrete expansion which leads to cracking, particularly when the water freezes. Techniques are known for treating concrete surfaces with penetrating sealers for protecting the concrete from damage due to water penetration. Examples of the penetrating sealers that can be used include silanes, siloxanes, silicones, linseed oil, and the like.

A standard procedure for treating a concrete surface with both a membrane-forming coating composition and a penetrating sealer is to apply the membrane-forming coating composition to the concrete immediately after the concrete has been laid, and then about 7-28 days later remove the membrane formed from the membrane-forming coating composition using physical and/or chemical removal techniques, and apply the penetrating sealer. This method leaves a lot to be desired in terms of convenience and efficiency. Thus, the problem in the art is to provide for a concrete treating composition that can be sprayed one time, on the same day that the concrete is laid. This invention, in one embodiment, provides a solution to this problem.

SUMMARY

This invention relates to a composition, comprising: (a) at least one organohydrocarbyloxysilane represented by the formula

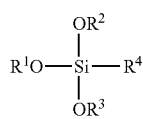

wherein $R^1$, $R^2$, and $R^3$ are independently hydrocarbyl groups containing from 1 to about 8 carbon atoms, and $R^4$ is a hydrocarbyl group containing from 1 to about 22 carbon atoms; and (b) at least one polymer derived from styrene and/or at least one styrene derivative, and at least one comonomer comprising one or more of acrylic acid, methacrylic acid, acrylonitrile, and/or at least one alkyl (meth)acrylate. In one embodiment, the composition further comprises (c) at least one fluid, the organohydrocarbyloxysilane (a) and polymer (b) being dispersed in the fluid.

In one embodiment, the invention relates to a process for making the foregoing composition, comprising: (1) mixing part of the polymer (b) with a fluid to form a first mixture; (2) adding the organohydrocarbyloxysilane (a) to the first mixture to form a second mixture; and (3) adding the remainder of the polymer (b) to the second mixture to form the composition.

In one embodiment, the invention relates to a process, comprising: (1) forming a concrete structure having a concrete surface; and (2) applying the composition to the concrete surface.

DETAILED DESCRIPTION

The term "hydrocarbyl" may refer to a group having a carbon atom directly attached to the remainder of a molecule and having a hydrocarbon or predominantly hydrocarbon character within the context of this invention. Such groups include the following:

(1) Purely hydrocarbon groups; that is, aliphatic, (e.g., alkyl or alkenyl), alicyclic (e.g., cycloalkyl or cycloalkenyl), aromatic, aliphatic- or alicyclic-substituted aromatic, aromatic-substituted aliphatic or alicyclic groups, and the like, as well as cyclic groups wherein the ring is completed through another portion of the molecule (that is, any two indicated substituents may together form an alicyclic group). Such groups are known to those skilled in the art. Examples include methyl, ethyl, octyl, decyl, octadecyl, cyclohexyl, phenyl, etc.

(2) Substituted hydrocarbon groups; that is, groups containing non-hydrocarbon substituents which do not alter the predominantly hydrocarbon character of the group. Those skilled in the art will be aware of suitable substituents. Examples include hydroxy, nitro, cyano, alkoxy, acyl, etc.

(3) Hetero groups; that is, groups which, while predominantly hydrocarbon in character, contain atoms other than carbon in a chain or ring otherwise composed of carbon atoms. Suitable hetero atoms will be apparent to those skilled in the art and include, for example, nitrogen, oxygen, and sulfur.

In general, no more than about three substituents or hetero atoms, and in one embodiment no more than one, will be present for each 10 carbon atoms in the hydrocarbyl group.

The term "alkyl (meth)acrylate" refers to either alkyl acrylate or alkyl methacrylate.

The term "fluid" refers to a gas, a liquid, or a gas or a liquid containing dispersed solids. The fluid may be in the form of a liquid containing dispersed liquid droplets. The fluid may be in the form of a gas containing dispersed liquid droplets.

The organohydrocarbyloxysilane (a) may be represented by the formula

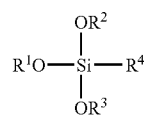

wherein $R^1$, $R^2$, and $R^3$ are independently hydrocarbyl groups containing from 1 to about 8 carbon atoms, and $R^4$ is a hydrocarbyl group containing from 1 to about 22 carbon atoms. The organohydrocarbyloxysilane, in one embodiment, may be referred to as a organoalkoxysilane. In one embodiment, $R^1$, $R^2$, and $R^3$ independently may contain from 1 to about 4 carbon atoms, and in one embodiment 1 or 2 carbon atoms. $R^1$, $R^2$, and $R^3$ independently may be alkyl groups. In one embodiment $R^1$, $R^2$, and $R^3$ are each ethyl groups. In one embodiment, $R^4$ may contain from 1 to about 18 carbon atoms, and in one embodiment from about 2 to about 16 carbon atoms, and in one embodiment from about 4 to about 12 carbon atoms, and in one embodiment about 8 carbon atoms. In one embodiment, $R^4$ may be a straight chain group. In one embodiment, $R^4$ may be a branched chain group. In one embodiment, $R^4$ may be a fluorine substituted group. The fluorine substituted $R^4$ group may contain from 1 to about 4 fluorine atoms for every 10 carbon atoms in the group, and in one embodiment the $R^4$ group may contain 1 fluorine atom. In one embodiment, $R^4$ may be an iso-octyl group. The organohydrocarbyloxysilane may have a molecular weight in the range of up to about 400, and in one embodiment from about 160 to about 360, and in one embodiment from about 210 to about 310.

The polymer (b) may comprise units derived from styrene and/or a styrene derivative, and units derived from one or more of acrylic acid, methacrylic acid, acrylonitrile, and/or at least one alkyl (meth)acrylate. In one embodiment the polymer (b) may comprise a copolymer, a terpolymer, or a mixture thereof. The polymer (b) may comprise from about 20% to about 90% by weight, and in one embodiment about 20% to about 80% by weight, and in one embodiment about 30% to about 60% by weight, and in one embodiment about 40% to about 90% by weight, and in one embodiment about 60% to about 80% by weight, of the units derived from styrene and/or styrene derivative; and from about 10% to about 80% by weight, and in one embodiment about 20% to about 80% by weight, and in one embodiment about 40% to about 70% by weight, and in one embodiment about 10% to about 60% by weight, and in one embodiment about 20% to about 40% by weight, of the units derived from one or more of acrylic acid, methacrylic acid, acrylonitrile, and/or at least one alkyl (meth)acrylate.

The styrene or styrene derivative used to form the polymer (b) may comprise one or more of styrene and/or a substituted styrene represented by the formula

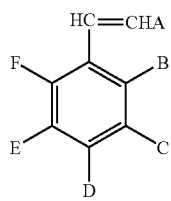

wherein each of A, B, C, D, E, and F is independently selected from hydrogen, $C_1$ to about $C_4$ alkyl or alkoxy groups (e.g., methyl or methoxy groups), halogroups (e.g., fluoro), thio, cyano, carboxylic acid or ester, or fluorinated alkyl groups of 1 to about 4 carbon atoms. In one embodiment, the styrene derivative may comprise vinyl toluene, divinyl benzene, or a mixture thereof.

The alkyl portion of the alkyl (meth)acrylates may contain from 1 to about 22 carbon atoms, and in one embodiment from 1 to about 12 carbon atoms, and in one embodiment from 1 to about 8 carbon atoms, and in one embodiment from 1 to about 4 carbon atoms. This alkyl group may be a straight chain or branched chain alkyl group. This alkyl group may be a cyclic alkyl group. This alkyl group may be a substituted alkyl group, the substituents being, for example, hydroxyl, fluoro, etc. In one embodiment, the alkyl (meth)acrylates may comprise one or more of methyl (meth)acrylate, ethyl (meth) acrylate, propyl (meth)acrylate, isopropyl (meth)acrylate, butyl (meth)acrylate, isobutyl (meth)acrylate, pentyl (meth) acrylate, hexyl (meth)acrylate, heptyl (meth)acrylate, 2-ethylhexyl (meth)acrylate, octyl (meth)acrylate, dodecyl (meth) acrylate, cyclohexyl (meth)acrylate, and derivatives of these alkyl (meth)acrylates such as 2-hydroxyethyl (meth)acrylate, 2-fluoroethyl (meth)acrylate, and the like.

In one embodiment, the polymer (b) may comprise units derived from styrene, methyl (meth)acrylate and butyl (meth) acrylate. In one embodiment, the polymer (b) may comprise from about 10% to about 80% by weight, and in one embodiment about 20% to about 40% by weight, units derived from styrene or at least one styrene derivative; from about 10% to about 90% by weight, and in one embodiment about 40% to about 80% by weight, units derived from methyl (meth)acrylate; and from about 1% to about 35% by weight, and in one embodiment about 5% to about 30% by weight, units derived from butyl (meth)acrylate.

The polymer (b) may have a glass transition temperature in the range from about −20° C. to about 105° C., and in one embodiment in the range from about 40° C. to about 80° C. The polymer (b) may have a number average molecular weight of up to about 25,000, and in one embodiment from about 8,000 to about 18,000. The polymer (b) may have an $M_W/M_N$ in the range from about 2 to about 20, and in one embodiment from about 5 to about 10.

In one embodiment, the organohydrocarbyloxysilane (a) and polymer (b) may be dispersed or dissolved in a fluid (c). The fluid (c) may comprise water or an organic solvent. The organic solvent may comprise at least one aromatic solvent, at least one aliphatic solvent, or a solvent mixture comprising at least one aromatic solvent and at least one aliphatic solvent. Examples of the aromatic solvent include benzene, toluene, xylene, alkylated (e.g., $C_2$-$C_{12}$ alkyl)benzenes, naphtha, and the like. The aromatic solvent may be Aromatic 100, which is a commercial aromatic solvent available from numerous sources, including Ashland Chemical and Shell. Examples of the aliphatic solvent include hexane, octane, decane, dodecane, mineral spirits, and the like. In one embodiment, the solvent may comprise a solvent mixture comprising from about 20% to about 95% by weight, and in one embodiment about 60% to about 75% by weight, of at least one aromatic solvent; and from about 5% to about 80% by weight and in one embodiment from about 25% to about 40% by weight of at least one aliphatic solvent.

In one embodiment, the inventive composition may be characterized by a VOC content of up to about 700 grams of VOC per liter, and in one embodiment up to about 600 grams of VOC per liter, and in one embodiment up to about 570 grams of VOC per liter. The term "VOC" means volatile organic compound. "Volatile organic compounds" are defined by the U.S. Environmental Protection Agency (EPA) as organic compounds which participate in atmospheric photochemical reactions, except for specific designated compounds. The compounds identified by the EPA as VOCs are described at 40 CFR 51.100, which is incorporated herein by reference.

In one embodiment, the composition may comprise: from about 5% to about 35% by weight, and in one embodiment about 15% to about 25% by weight, of the organohydrocarbyloxysilane (a); from about 20% to about 50% by weight, and in one embodiment about 30% to about 40% by weight, of the polymer (b); and from about 15% to about 75% by weight, and in one embodiment from about 35% to about 55% by weight, of the fluid (c).

The inventive composition may be made by a process comprising: (1) mixing part (for example, about 25% to about 75% by weight, and in one embodiment about 50% by weight) of the polymer (b) with the fluid (c) to form a first mixture; (2) adding the organohydrocarbyloxysilane (a) to the first mixture to form a second mixture; and (3) adding the remainder of the polymer (b) to the second mixture to form the inventive composition. In one embodiment, a vortex may be formed in the first mixture during step (2) and the organohydrocarbyloxysilane (a) may be added to the vortex. In one embodiment, the addition of the organohydrocarbyloxysilane (a) to the vortex during step (2) may cause the formation of a striae containing mixture; in this embodiment mixing may be continued until the striae are removed. The remainder of the organohydrocarbyloxysilane (a) may then be added, and the mixing may be continued until the organohydrocarbyloxysilane (a) is dispersed (for example, for about 30 minutes). This process may be conducted at atmospheric pressure and at a temperature in the range from about 20° C. to about 50° C., and in one embodiment from about 20° C. to about 30° C.

The inventive composition may be used for treating a concrete surface to retain moisture in the concrete during curing and prevent moisture from entering the concrete after curing has been completed. The process may comprise, (1) forming a concrete structure having a concrete surface, and (2) applying the inventive composition to the concrete surface. The concrete structure may comprise any concrete structure, for example, a driveway, sidewalk, floor, steps, etc. The concrete structure may be made using any concrete composition. For example, the concrete composition may comprise from about 10% to about 15% cement, from about 35% to about 45% gravel or crushed stone (coarse aggregate), about 20% to about 30% sand (fine aggregate), from about 15% to about 20% water, and from about 5% to about 8% air. The process for making the concrete structure may include finishing the surface of the concrete structure. Finishing may include applying a surface texture such as a smooth or swirling pattern in the surface of the concrete structure and/or cutting expansion joints in the structure. In one embodiment, the inventive composition may be applied to the concrete surface within about 6 hours after the completion of step (1), and in one embodiment from about 1 to about 5 hours, and in one embodiment, from about 2 to about 4 hours, and in one embodiment about 3 hours, after the completion of step (1). The inventive composition may be applied to the surface of the concrete structure using any suitable technique, including, spraying (for example, air spraying, airless spraying, etc.), brushing, squeegee, etc. In one embodiment, the composition is applied by spraying. The coat weight of the inventive composition as applied to the concrete surface may be in the range from about 0.02 to about 0.10 gallons per square yard, and in one embodiment, about 0.03 to about 0.06 gallons per square yard. The inventive composition may be applied at a temperature in the range from about 5° C. to about 35° C., and in one embodiment about 15° C. to about 25° C.

EXAMPLE 1

A composition for treating a concrete surface having the following formulation is prepared: (1) 20% by weight BS 1316 (a product of Wacker identified as an organoalkoxysilane); (2) 35% by weight Forton CS 7501 (a product of Valspar identified as a terpolymer derived from styrene, methyl methacrylate and butyl methacrylate dispersed in an aromatic vehicle, the product having a 55% by weight resin concentration); (3) 30% by weight Aromatic 100 (a product of Ashland Chemical identified as an aromatic solvent); and (4) 15% by weight mineral spirits.

This composition is prepared as follows. A solvent mixture of the Aromatic 100 and mineral spirits is prepared at room temperature. One-half of the Forton CS 7501 is added to the solvent mixture to form a solution. The solution is stirred with the result being the formation of a vortex. The BS 1316 is added slowly to the vortex with the result being the formation of striae. The mixture is stirred until the striae disappear. The remainder of the CS 7501 is added. The mixture is stirred for an additional one-half hour to provide the desired concrete treating composition.

EXAMPLE 2

A concrete driveway is formed by pouring cement into a formed area. The concrete is allowed to cure and a final finish in the form of a swirling pattern is formed in the concrete surface. The concrete treating composition disclosed in Example 1 is sprayed on the concrete surface about 2 hours after the final finish is formed in the concrete surface. The coat weight of the applied concrete treating composition is 0.045 gallon per square yard.

While the invention has been explained in relation to specific embodiments, it is to be understood that various modifications thereof will become apparent to those skilled in the art upon reading the specification. Therefore, it is to be understood that the invention disclosed herein is intended to cover such modifications as fall within the scope of the appended claims.

The invention claimed is:

1. A composition, comprising:
   (a) at least one organohydrocarbyloxysilane represented by the formula

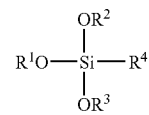

wherein $R^1$, $R^2$, and $R^3$ are each ethyl groups, and $R^4$ is a alkyl group containing about 8 carbon atoms; and
   (b) at least one polymer derived from styrene and/or at least one styrene derivative, and at least one comonomer comprising one or more of acrylic acid, methacrylic acid, acrylonitrile, and/or at least one alkyl (meth)acrylate.

2. The composition according to claim 1, wherein $R^4$ is an iso-octyl group.

3. A composition, comprising:
   (a) at least one organohydrocarbyloxysilane represented by the formula

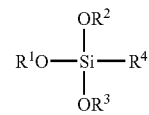

wherein $R^1$, $R^2$, and $R^3$ are independently hydrocarbyl groups containing from 1 to about 8 carbon atoms, and $R^4$ is a hydrocarbyl group containing from 1 to about 22 carbon atoms; and
   (b) at least one polymer comprising a terpolymer, the terpolymer comprising from about 10% to about 80% by weight units derived from styrene and/or at least one styrene derivative; from about 10% to about 90% by weight units derived from methyl (meth)acrylate; and from about 1% to about 35% by weight units derived from butyl (meth)acrylate.

4. A composition, comprising:
(a) at least one organohydrocarbyloxysilane represented by the formula

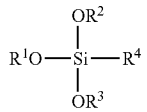

wherein $R^1$, $R^2$, and $R^3$ are independently hydrocarbyl groups containing from 1 to about 8 carbon atoms, and $R^4$ is a fluorine substituted alkyl group containing from 1 to about 22 carbon atoms;
(b) at least one polymer derived from styrene and/or at least one styrene derivative, and at least one comonomer comprising one or more of acrylic acid, methacrylic acid, acrylonitrile, and/or at least one alkyl (meth)acrylate; and
(c) at least one fluid, the organohydrocarbyloxysilane (a) and polymer (b) being dispersed in the fluid.

5. A composition, comprising:
(a) at least one organohydrocarbyloxysilane represented by the formula

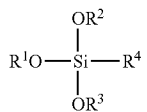

wherein $R^1$, $R^2$, and $R^3$ are independently hydrocarbyl groups containing from 1 to about 8 carbon atoms, and $R^4$ is an alkyl group of about 8 carbon atoms;
(b) at least one polymer derived from styrene and/or at least one styrene derivative, and at least one comonomer comprising one or more of acrylic acid, methacrylic acid, acrylonitrile, and/or at least one alkyl (meth)acrylate; and
(c) at least one fluid, the organohydrocarbyloxysilane (a) and polymer (b) being dispersed in the fluid.

6. A composition, comprising:
(a) at least one organohydrocarbyloxysilane represented by the formula

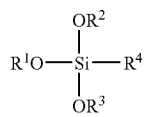

wherein $R^1$, $R^2$, and $R^3$ are independently hydrocarbyl groups containing from 1 to about 8 carbon atoms, and $R^4$ is an iso-octyl group;
(b) at least one polymer derived from styrene and/or at least one styrene derivative, and at least one comonomer comprising one or more of acrylic acid, methacrylic acid, acrylonitrile, and/or at least one alkyl (meth)acrylate; and
(c) at least one fluid, the organohydrocarbyloxysilane (a) and polymer (b) being dispersed in the fluid.

* * * * *